United States Patent [19]
Rall

[11] Patent Number: 5,464,284
[45] Date of Patent: Nov. 7, 1995

[54] AUTOCALIBRATING NON-CONTACT TEMPERATURE MEASURING TECHNIQUE EMPLOYING DUAL RECESSED HEAT FLOW SENSORS

[75] Inventor: Dieter L. Rall, Newport Beach, Calif.

[73] Assignee: Luxtron Corporation, Santa Clara, Calif.

[21] Appl. No.: 223,631

[22] Filed: Apr. 6, 1994

[51] Int. Cl.$^6$ .............................. G01J 5/08; G01K 13/06
[52] U.S. Cl. .......................... 374/131; 374/121; 73/160; 364/557
[58] Field of Search .................... 374/121, 126, 374/127, 131, 130, 29, 30; 73/160; 364/557

[56] References Cited

U.S. PATENT DOCUMENTS

| | | | |
|---|---|---|---|
| 2,991,654 | 7/1961 | Englehard | 374/135 |
| 3,111,844 | 11/1963 | Van Luik, Jr. | 374/29 |
| 3,427,882 | 2/1969 | Wagner | 374/120 |
| 3,430,492 | 3/1969 | Matsumoto et al. | 374/153 |
| 3,475,962 | 11/1969 | Mazur | 374/121 |
| 3,525,260 | 8/1970 | Kung | 136/214 |
| 3,542,123 | 11/1970 | Hornbaker et al. | 165/39 |
| 3,605,490 | 9/1971 | Progelhof et al. | 374/29 |
| 3,715,923 | 2/1973 | Hornbaker et al. | 374/134 |
| 3,720,103 | 3/1973 | Adams et al. | 374/29 |
| 3,926,053 | 12/1975 | Schurrer et al. | 374/101 |
| 4,408,903 | 10/1983 | Baldasarri | 374/121 |
| 4,621,615 | 11/1986 | McGee | 374/29 |
| 4,906,105 | 3/1990 | Geake | 374/121 |
| 4,919,542 | 4/1990 | Nulman et al. | 374/126 |
| 5,061,084 | 10/1991 | Thompson et al. | 374/127 |
| 5,216,625 | 6/1993 | Rall | 374/121 |
| 5,294,200 | 3/1994 | Rall | 374/120 |

FOREIGN PATENT DOCUMENTS 1573346 5/1969 Germany.

*Primary Examiner*—Diego F. F. Gutierrez
*Attorney, Agent, or Firm*—Majestic, Parsons, Siebert & Hsue

[57] ABSTRACT

A non-contact temperature measuring system and a dual-reference body structure employed therein is described, wherein a moving object whose temperature is to be determined, is passed by first and second reference bodies having a same form factor with respect to the moving object. Each of the reference bodies has a heat flow sensor embedded at the end of a cavity formed in the reference body such that the heat flow sensor primarily responds to radiation heat flow generated by a temperature differential between the moving object and its respective reference body. With the reference bodies thermally isolated and maintained at different temperatures by heaters embedded in the reference bodies, and their respective heat flow sensors properly calibrated, the temperature of the moving object is calculated, by applying the Stefan-Boltzmann law, from the respective temperatures of the first and second reference bodies, and the respective calibrated output voltages of the respective heat flow sensors of the first and second reference bodies.

23 Claims, 5 Drawing Sheets

AUTOCALIBRATING NON-CONTACT TEMPERATURE MEASURING TECHNIQUE EMPLOYING DUAL RECESSED HEAT FLOW SENSORS

BACKGROUND OF THE INVENTION

This invention relates in general to non-contact temperature measuring techniques and in particular, to a non-contact temperature measuring technique and apparatus for measuring the temperature of an object from radiation heat flow emitted from the object.

It is well known that when two objects are placed in close proximity to each other, they will thermally interact through heat exchange until both objects come to thermal equilibrium, and that the magnitude of the heat flow between the two objects during such periods is related to their temperature differential.

Heat exchange between two objects can occur by any one or a combination of the methods of conduction, convection or radiation. Conventional temperature measuring techniques employ at least one of these methods when determining the temperature of an object by bringing the object in close proximity to at least one reference body of known temperature. Whereas conduction is generally used in contact temperature measuring techniques, convection is often used in non-contact temperature measuring techniques.

U.S. Pat. No. 5,216,625 entitled "Autocalibrating Dual Sensor Non-Contact Temperature Measuring Device," issued to the inventor of the present invention, and incorporated herein by reference, describes a technique and apparatus using convection heat flow measurements for determining the temperature of a moving object by proximately positioning dual thermal sinks or reference bodies along a line of travel of the moving object. Thermally connected to each reference body is a temperature sensor and a heat flow sensor whose sensing surface is facing the line of travel of the moving object. Each heat flow sensor is positioned such that it is primarily responsive to the convection heat flow generated as a result of the moving object being at a different temperature than the heat flow sensor and its respective reference body. By maintaining a temperature differential between the dual reference bodies, by positioning them and their respective heat flow sensors such that they are equidistant from the line of travel of the moving object, and by calibrating their respective heat flow sensors such that they have the same sensitivity, the temperature of the moving object is calculated from the following equation:

$$T_{obj} = T_1 + V_1 \frac{(T_1 - T_2)}{(V_2 - V_1)} \quad (1)$$

where $T_{obj}$ is the temperature of the moving object, $T_1$ and $V_1$ are, respectively, the temperature of one of the reference bodies and the calibrated output voltage of its heat flow sensor, and $T_2$ and $V_2$ are, respectively, the temperature of the other reference body and the calibrated output voltage of its heat flow sensor.

SUMMARY OF THE INVENTION

The present invention is based upon the observation that the performance, accuracy and temperature measuring range of non-contact temperature measuring systems based upon radiation heat flow measurements of a moving object may be superior to those based upon convection heat flow measurements.

For example, convection heat flow measurement techniques practically require the heat flow sensor to be placed considerably closer to a moving object whose temperature is being determined, than radiation heat flow measurement techniques require. This is because it is preferable to position the heat flow sensor in the laminar flow portion of the moving object's boundary layer when measuring its convection heat flow, and such laminar flow portion may only extend to less than ⅛ of an inch from the moving object. On the other hand, when making radiation heat flow measurements, the heat flow sensor may be placed further away from the moving object, such as, for example, 2–6 inches away and as a consequence, the accuracy, reliability, and operational life of the heat flow sensor is extended.

As another example, radiation heat flow measurement techniques practically allow the measurement of higher temperatures than convection heat flow measurement techniques. This is because the radiation heat flow is determined by using the Stefan-Boltzmann law which relates the radiation heat flow to the fourth power of the object's temperature, whereas convection heat flow is determined by Fourier's law, for example, which relates the convection heat flow to the first power of the object's temperature. In particular, convection heat flow measurement techniques have been found to be practical in determining the temperature of moving objects in a range of room temperature to 500° F., and the radiation heat flow measurement technique of the present invention has been found to be practical in determining the temperature of moving objects in a temperature range of 500° F. to 1200° F., using conventional heat flow sensors.

Accordingly, it is an object of the present invention to provide a non-contact temperature measuring technique utilizing radiation heat flow measurements of a moving object rather than convection heat flow measurements.

This and additional objects are accomplished by the various aspects of the present invention, wherein briefly stated, one aspect is a non-contact temperature measurement system for measuring the temperature of an object, comprising first and second reference bodies thermally isolated from each other and maintained at different temperatures. Each of the reference bodies has a heat flow sensor embedded in a cavity formed through a surface of the reference body such that the heat flow sensor responds primarily to the net radiation heat flow generated by a temperature differential between the object and the reference body when the object is in a conical line of sight of a sensing surface of the heat flow sensor. The cavity is formed of sufficient depth to substantially prevent the heat flow sensor from responding to any convection heat flow generated by the moving object.

With the reference bodies formed such that they have the same form factor with respect to the object, and their respective heat flow sensors calibrated so that they have the same sensitivity, the system further includes means for calculating the temperature of the object from the equation:

$$T_{obj} = \left( T_1^4 + V_1 \left[ \frac{(T_2)^4 - (T_1)^4}{V_1 - V_2} \right] \right)^{1/4} \quad (2)$$

where $T_{obj}$ is the absolute temperature of the object (wherein the term "absolute" is understood to mean that the temperature is in degrees Rankine), $T_1$ and $T_2$ are respectively the absolute temperatures of the first and second reference bodies, and $V_1$ and $V_2$ are respectively the output voltages of the heat flow sensors of the first and second reference bodies.

Another aspect of the present invention is a non-contact method of determining the temperature of a moving object, comprising the steps of: positioning first and second heat flow sensors in respective cavities of first and second reference bodies such that each of the heat flow sensors detects substantially only net radiation heat flow from the moving object and its respective reference body when the moving object is positioned in a conical line of sight extending out of its respective cavity, wherein the first and second reference bodies have the same form factors with respect to the moving object; thermally connecting the first and second heat flow sensors to their respective reference bodies such that the temperature of the first heat flow sensor is substantially the same as the temperature of the first reference body, and the temperature of the second heat flow sensor is substantially the same as the temperature of the second reference body; calibrating the first and second heat flow sensors to a same sensitivity; applying and maintaining a temperature differential between the first and second reference bodies; passing the moving object by respective conical lines of sight of the first and second heat flow sensors such that the output voltage of the first heat flow sensor is responsive to a first net radiation heat flow generated by a temperature differential between the moving object and the first reference body, and the output voltage of the second heat flow sensor is responsive to a second net radiation heat flow generated by a temperature differential between the moving object and the second reference body; measuring the respective temperatures of the first and second reference bodies; and calculating the temperature of the moving object from the output voltages of the first and second heat flow sensors, and the temperatures of the first and second reference bodies.

Additional objects, features and advantages of the various aspects of the present invention will become apparent from the following description of its preferred embodiment, which description should be taken in conjunction with the accompanying drawings.

DESCRIPTION OF THE PREFERRED EMBODIMENT

Figure 1A:
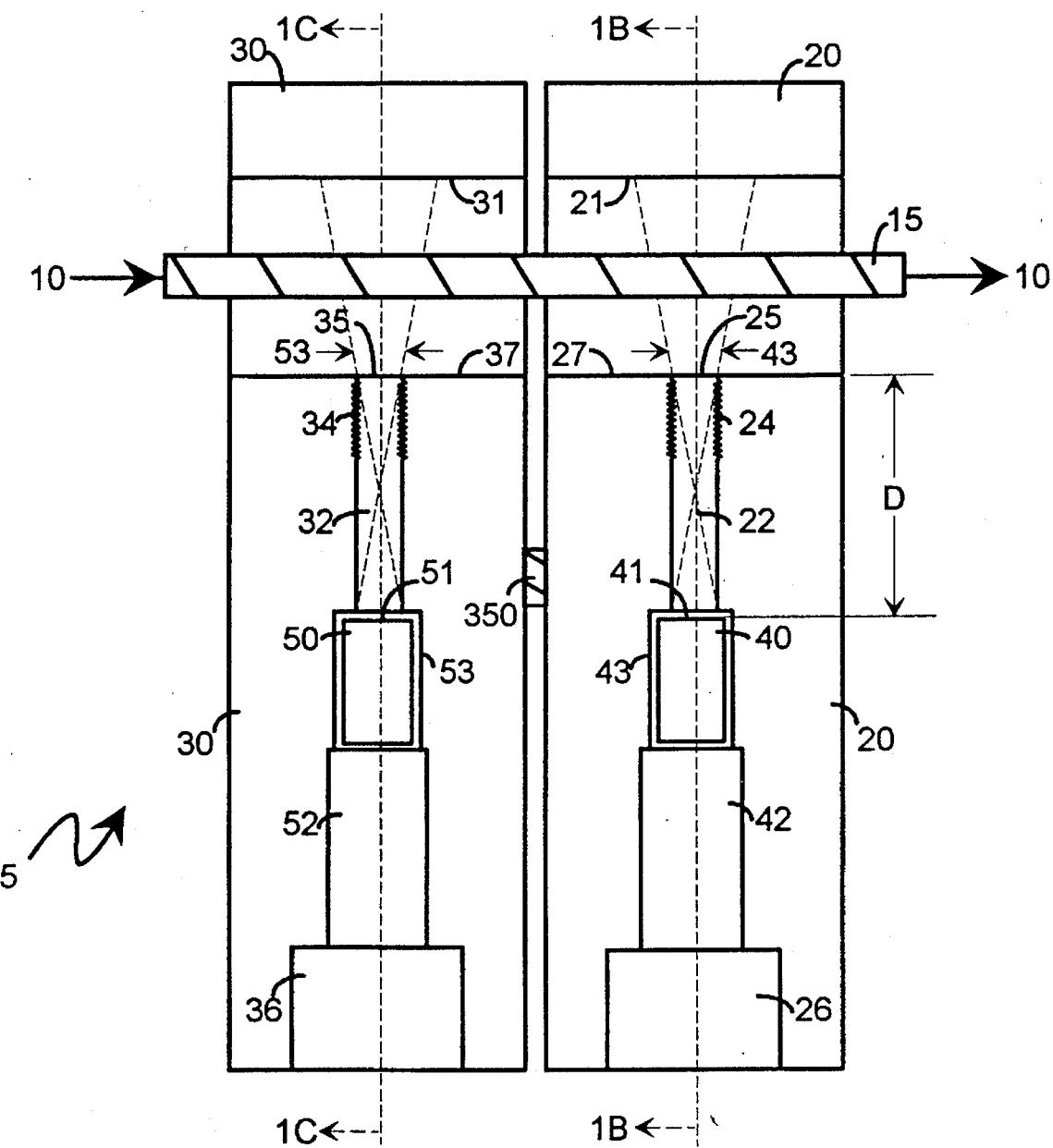
FIG. 1A illustrates, as an example, a cross-sectional front view of a dual reference body structure, utilizing aspects of the present invention, useful for measuring the temperature of a moving object.
Figure 1B:
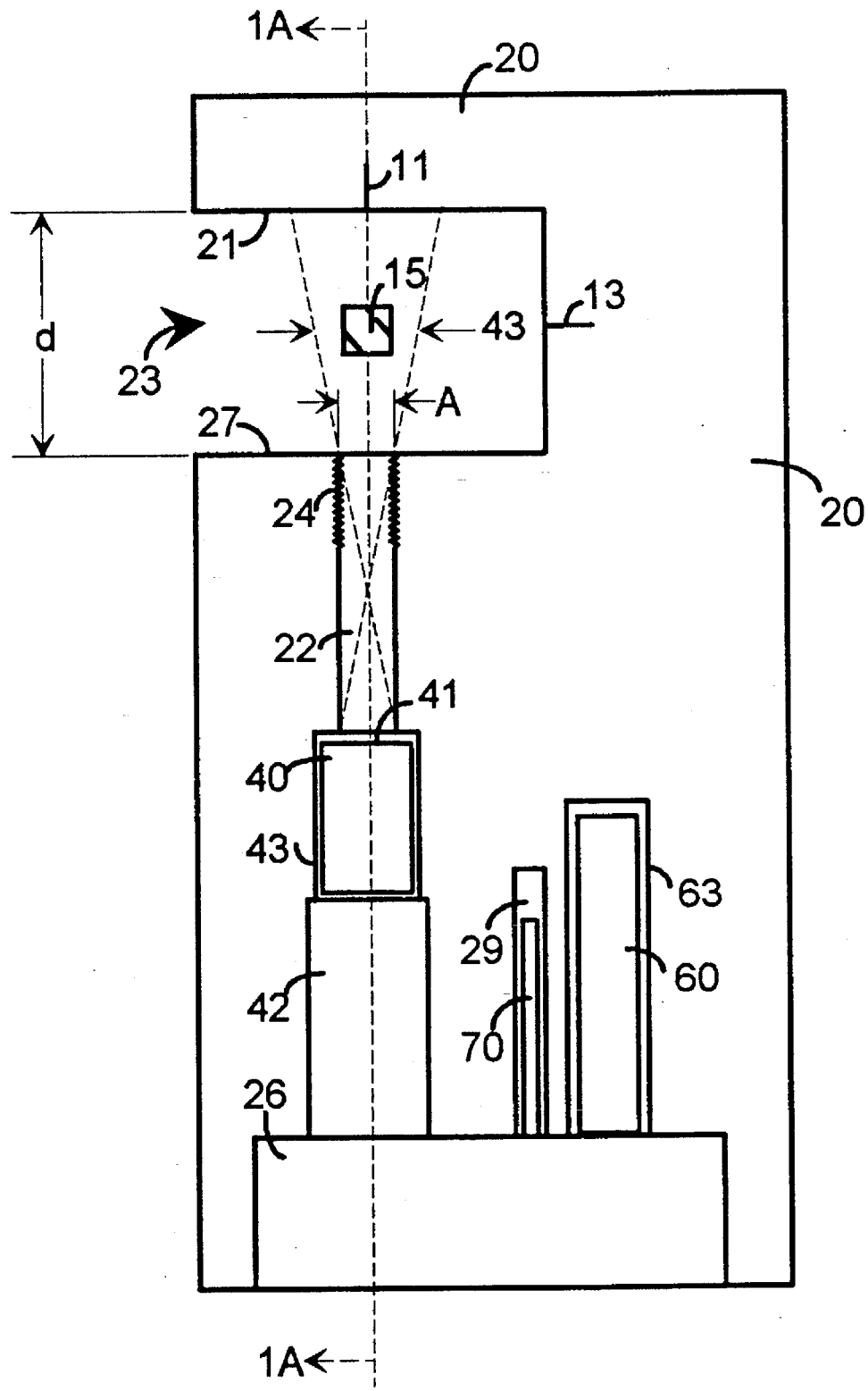
FIG. 1B illustrates a first cross-sectional side view of the dual reference body structure of FIG. 1A, taken through a first of the dual reference bodies.
Figure 1C:
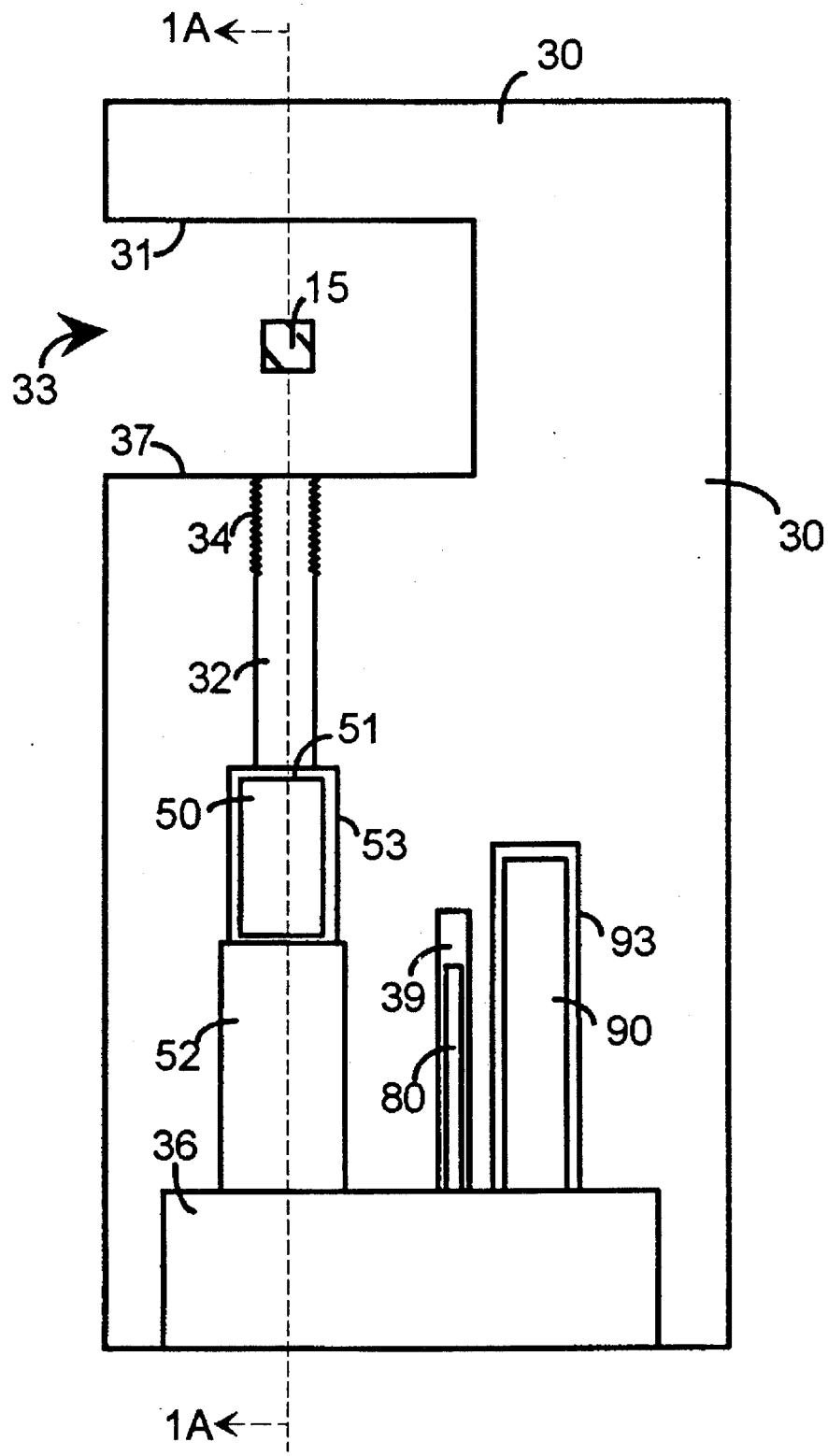
FIG. 1C illustrates a second cross-sectional side view of the dual reference body structure of FIG. 1A, taken through a second of the dual reference bodies.

FIGS. 1A–1C illustrate a dual reference body structure 5 useful for measuring the temperature of a moving object 15, such as, for examples, a filament, a wire, or an aluminum ingot, billet, or sheet, as the object 15 travels along a line of travel 10 passing through the structure 5. In particular, FIG. 1A illustrates a cross-sectional front view of the structure 5, FIG. 1B illustrates a cross-sectional side view through a first reference body 20 of the dual reference body structure 5, and FIG. 1C illustrates a cross-sectional side view through a second reference body 30 of the dual reference body structure 5.

Referring first to FIGS. 1A and 1B, the first reference body 20, preferably formed of copper or other highly conductive material, such as aluminum, has first and second surfaces, 27 and 21, respectively, formed parallel to each other such that they define a gap 23 through which the line of travel 10 of the moving object 15 passes. The distance "d" between the first and second surfaces, 27 and 21, is selected such that it is large enough to allow the moving object 15 to freely pass through, yet small enough so that both surfaces can thermally interact with the moving object 15 as it passes through. Positioning of the line of travel 10 of the moving object 15 is made predictable and consistent by utilizing alignment marks, 11 and 13, when setting up the temperature measuring test.

Embedded in the first reference body 20 are a first heat flow sensor 40 housed in a first heat flow sensor cavity 43, a first temperature sensor 70 housed in a first temperature sensor cavity 29, and a heater 60 housed in a heater cavity 63. Both the first heat flow sensor 40 and the first temperature sensor 70 are thermally connected to the first reference body 20, through their respective cavities, for example, so that their respective temperatures are substantially the same as the first reference body 20. In the preferred embodiment of the present invention, the first heat flow sensor 40 is a thermopile, and the first temperature sensor 70 is a conventional resistance temperature detector ("RTD") whose operation and construction are well known in the art. Electrical connections from the first heat flow sensor 40, the first temperature sensor 70, and the heater 60 are passed through to an interconnection cavity 26, where they are made accessible to electrically interconnect with other devices.

A sensing surface 41 of the first heat flow sensor 40 is provided a conical line of sight 43 to the line of travel 10 of the moving object 15 through a cavity 22 extending from the sensing surface 41 up to an aperture 25 formed in the first surface 27 of the first reference body 20. The cavity 22 is formed, for example, by tap drilling with a 5/16 inch drill through the first surface 27 in a perpendicular direction down to the first heat flow sensor cavity 43. Preferably, the cavity 22 is cylindrically formed in such a manner that the size of its aperture 25 and the depth "D" from which the sensing surface 41 of the first heat flow sensor 40 lies below the first surface 27, which together define the angle of the conical line of sight 43, are sufficient to prevent convection heat flow from entering the cavity 22 and reaching the sensing surface 41 of the heat flow sensor 40. For example, in the preferred mode of the invention, an aperture diameter "A" of 5/16 inches and sensing surface depth "D" of approximately 1.0 inches is employed.

Accordingly, with the cavity 22 so constructed, the sensing surface 41 of the first heat flow sensor 40 responds primarily to net radiation heat exchange between the moving object 15 and the first reference body 20 including its heat flow sensor 40 as it passes by the conical line of sight 43 of the first heat flow sensor 40, due to the temperature differential between the moving object 15 and the first reference body 20 including its heat flow sensor 40, which is substantially at the same temperature as the first reference body 20. To minimize unwanted reflections of radiant energy waves within the cavity 22, all inside surfaces of the cavity 22, viewed by the first heat flow sensor 40, are preferably bead blasted and painted black to form a high emissivity or absorptive surface. Alternatively or additionally, the walls 24 of the cavity 22 may be roughened or serrated at least near its aperture 25.

The net radiation heat flow, $\dot{q}_{obj-ref1}$, can be determined from an output voltage, $V_1$, of the first heat flow sensor 40, per equation (3) below, and it can be determined by using the Stefan-Boltzmann Law, per equation (4) below.

$$\dot{q}_{obj-ref1} = C_1 \cdot V_1 \quad (3)$$

$$\dot{q}_{obj-ref1} = F_{obj-ref1} \cdot E_{obj} \cdot \sigma \cdot [(T_{obj})^4 - (T_{ref1})^4] \quad (4)$$

where: $\dot{q}_{obj-ref1}$=net radiation heat flow in BTU/(hr-ft$^2$);

$F_{obj-ref1}$=form factor of the moving object 15 with respect to the first reference body 20;

$E_{obj}$=emissivity of the moving object 15 with respect to the first reference body 2;

$\sigma$=Stefan-Boltzmann constant;

$T_{obj}$=absolute temperature of the moving object 15; and $T_{ref1}$=absolute temperature of the first reference body 20.

Before continuing with the description of the dual reference body structure 5, it is worthwhile to point out a major reason why a single reference body cannot practically be used in determining the temperature of a moving object. Theoretically, the temperature $T_{obj}$ of the moving object 15 can be derived by solving equations (3) and (4) after calibrating the first heat flow sensor 40, if the form factor $F_{obj-ref1}$ of the moving object 15 with respect to the first reference body 20 and the emissivity $E_{obj}$ of the moving object 15 remain constant. In practice, however, these terms do not remain constant for a number of well known reasons. Accordingly, the dual reference body structure 5 of the present invention is used to eliminate the effects of such variations in the terms, $F_{obj-ref1}$ and $E_{obj}$.

Referring now to FIGS. 1A and 1C, the second reference body 30, is constructed similar to the first reference body 20. In particular, it is preferably formed of copper or other highly conductive material, such as aluminum, and has first and second surfaces, 37 and 31, respectively, formed parallel to each other such that they define a gap 33 through which the line of travel 10 of the moving object 15 passes. The distance between the first and second surfaces, 37 and 31, is selected such that it is large enough to allow the moving object 15 to freely pass through, yet small enough so that both surfaces can thermally interact with the moving object 15 as it passes through. As previously mentioned with respect to the first reference body 20, positioning of the line of travel 10 of the moving object 15 is made predictable and consistent by utilizing alignment marks, 11 and 13, when setting up the temperature measuring test. The line of travel 10 does not exactly have to align with the alignment marks, 11 and 13, however, as long as the first and second heat flow sensors, 40 and 50, respectively, see the same misalignment (i.e., as long as the first and second reference bodies, 20 and 30, have the same form factor with respect to the moving object 15).

Embedded in the second reference body 30 are a second heat flow sensor 50 housed in a second heat flow sensor cavity 53, a second temperature sensor 80 housed in a second temperature sensor cavity 39, and a second heater 90 housed in a second heater cavity 93. Both the second heat flow sensor 50 and the second temperature sensor 80 are thermally connected to the second reference body 30, through their respective cavities, for example, so that their respective temperatures are substantially the same as the second reference body 30. In the preferred embodiment of the present invention, the second heat flow sensor 50 is a thermopile, and the second temperature sensor 80 is a conventional RTD. Electrical connections from the second heat flow sensor 50, the second temperature sensor 80, and the second heater 90 are passed through to the interconnection cavity 36, where they are made accessible, along with their counterparts from the first reference body 20, to electrically interconnect with other devices.

A sensing surface 51 of the second heat flow sensor 50 is provided a conical line of sight 53 to the line of travel 10 of the moving object 15 through a cavity 32 extending from the sensing surface 51 up to an aperture 35 formed in the first surface 37 of the second reference body 30. The cavity 32 is formed, for example, in the same manner as described in reference to cavity 22 of the first reference body 20, and preferably, is identical in construction. In particular, the size of its aperture 35 and its depth D are sufficient to prevent convection heat flow from entering the cavity 32 and reaching the sensing surface 51 of the second heat flow sensor 50.

Accordingly, with the cavity 32 so constructed, the sensing surface 51 of the second heat flow sensor 50 responds primarily to net radiation heat exchange between the moving object 15 and the second reference body 30 including the second heat flow sensor 50 as it passes by the conical line of sight 53 of the second heat flow sensor 50, due to the temperature differential between the moving object 15 and the second reference body 30 including the second heat flow sensor 50, which is substantially at the same temperature as the second reference body 30. To minimize unwanted reflections of radiant energy waves with the cavity 32, all inside surfaces of the cavity 32, viewed by the second heat flow sensor 50, are preferably bead blasted and painted black to form a high emissivity or absorptive surface. Alternatively or additionally, the walls 34 of the cavity 32 may be roughened or serrated at least near its aperture 35.

The net radiation heat flow, $\dot{q}_{obj-ref2}$, can be determined from an output voltage, $V_2$, of the second heat flow sensor 50, per equation (5) below, and it can be determined by using the Stefan-Boltzmann Law, per equation (6) below.

$$\dot{q}_{obj-ref2} = C_2 \cdot V_2 \quad (5)$$

$$\dot{q}_{obj-ref2} = F_{obj-ref2} \cdot E_{obj} \cdot \sigma \cdot [(T_{obj})^4 - (T_2)^4] \quad (9)$$

where: $\dot{q}_{obj-ref2}$=net radiation heat flow in BTU/(hr-ft$^2$);

$F_{obj-ref2}$=form factor of the moving object 15 with respect to the second reference body 30;

$E_{obj}$=emissivity of the moving object 15 with respect to the second reference body 30;

$\sigma$=Stefan-Boltzmann constant;

$T_{obj}$=absolute temperature of the moving object 15; and $T_{ref2}$=absolute temperature of the second reference body 30.

By constructing the first and second reference bodies, 20 and 30, respectively, such that they have the same form factor (i.e., $F_{obj-ref1} = F_{obj-ref2}$) and emissivity characteristics with respect to the moving object 15, maintaining the two reference bodies, 20 and 30, at different temperatures (e.g., $T_1 > T_2$), and calibrating the first and second heat flow sensors, 40 and 50, respectively, such that they have the same sensitivity (e.g., $C_1 = C_2$), the temperature $T_{obj}$ of the moving object can readily be determined from equation (7) below, which is formed by combining equations (3)–(6) and canceling out like terms. In particular, the emissivity $E_{obj}$ and form factors, $F_{obj-ref1}$ and $F_{obj-ref2}$, of the moving object 15 are cancelled out through such combination.

$$T_{obj} = \left( T_1^4 + V_1 \left[ \frac{(T_2)^4 - (T_1)^4}{V_1 - V_2} \right] \right)^{1/4} \quad (7)$$

A temperature differential between the first and second reference bodies, 20 and 30, is caused and maintained by first and second heaters, 60 and 90, embedded within the first and second reference bodies, 20 and 30, respectively. For example, in one configuration, the first heater 60 maintains the first reference body at a temperature of 475° F. while the second heater maintains the second reference body at 175° F. In other configurations, a wider temperature range may be preferable, however, the upper temperature (e.g., 475° F.) may be limited by the type of heat flow sensors being used. Thermal interaction is prevented between the first and second reference bodies, 20 and 30, respectively, by positioning isolation material 350, for example, an airspace and radiation shields such as polished aluminum, between the two reference bodies, 20 and 30.

Calibration of the first and second heat flow sensors, 40 and 50, respectively, is accomplished, for example, by adjusting the sensitivity $C_1$ (i.e., the output voltage $V_1$) of the first heat flow sensor 40, through a trimming potentiometer (not shown) associated with the first heat flow sensor 40, for example, until the output voltage $V_1$ satisfies equation (7) above, wherein the required output voltage $V_1$ is determined by exposing the first and second heat flow sensors, 40 and 50, to an object having a known temperature $T_{obj}$, and plugging the absolute value of the known object temperature, $T_{obj}$, the measured absolute temperatures, $T_1$ and $T_2$, of the first and second reference bodies, 20 and 30, respectively, and a measured output voltage $V_2$ of the second heat flow sensor 50 into equation (7) and solving for $V_1$.

The second surfaces, 21 and 31, of the first and second reference bodies, 20 and 30, respectively, are formed such that they ensure that the first and second heat flow sensors, 40 and 50, respectively, only detect the net radiation heat exchange between the moving object 15 and their respective reference bodies, 20 and 30, including their respective heat flow sensors, 40 and 50, when the moving object 15 is passing by their respective conical lines of sights, 43 and 53. Since the second surfaces, 21 and 31, are part of their respective reference bodies, 20 and 30, and consequently, are at the same temperatures as their respective reference bodies, 20 and 30, and the first and second heat flow sensors, 40 and 50, are thermally connected to their respective first and second reference bodies, 20 and 30, the second surfaces, 21 and 31, are substantially at the same temperatures as their respective heat flow sensors, 40 and 50, thus ensuring that the first and second heat flow sensors, 40 and 50, are isothermal, i.e., they detect zero net radiation heat exchange from the background when the moving object 15 is passing by their respective conical lines of sights, 43 and 53.

Accordingly, when the moving object 15 does not entirely cover the conical lines of sight, 43 and 53, of the first and second heat flow sensors, 40 and 50, respectively, it is beneficial to have such second surfaces, 21 and 31, to prevent extraneous background effects from contributing to the amount of net radiation being detected by the first and second heat flow sensors, 40 and 50, respectively, and as a consequence, causing erroneous readings by these two sensors. On the other hand, if the moving object 15 does entirely cover the conical lines of sight, 43 and 53, of the first and second heat flow sensors, 40 and 50, respectively, such as for example, if the moving object 15 is a large sheet of aluminum, then such second surfaces, 21 and 31, would not be required.

Figure 2:
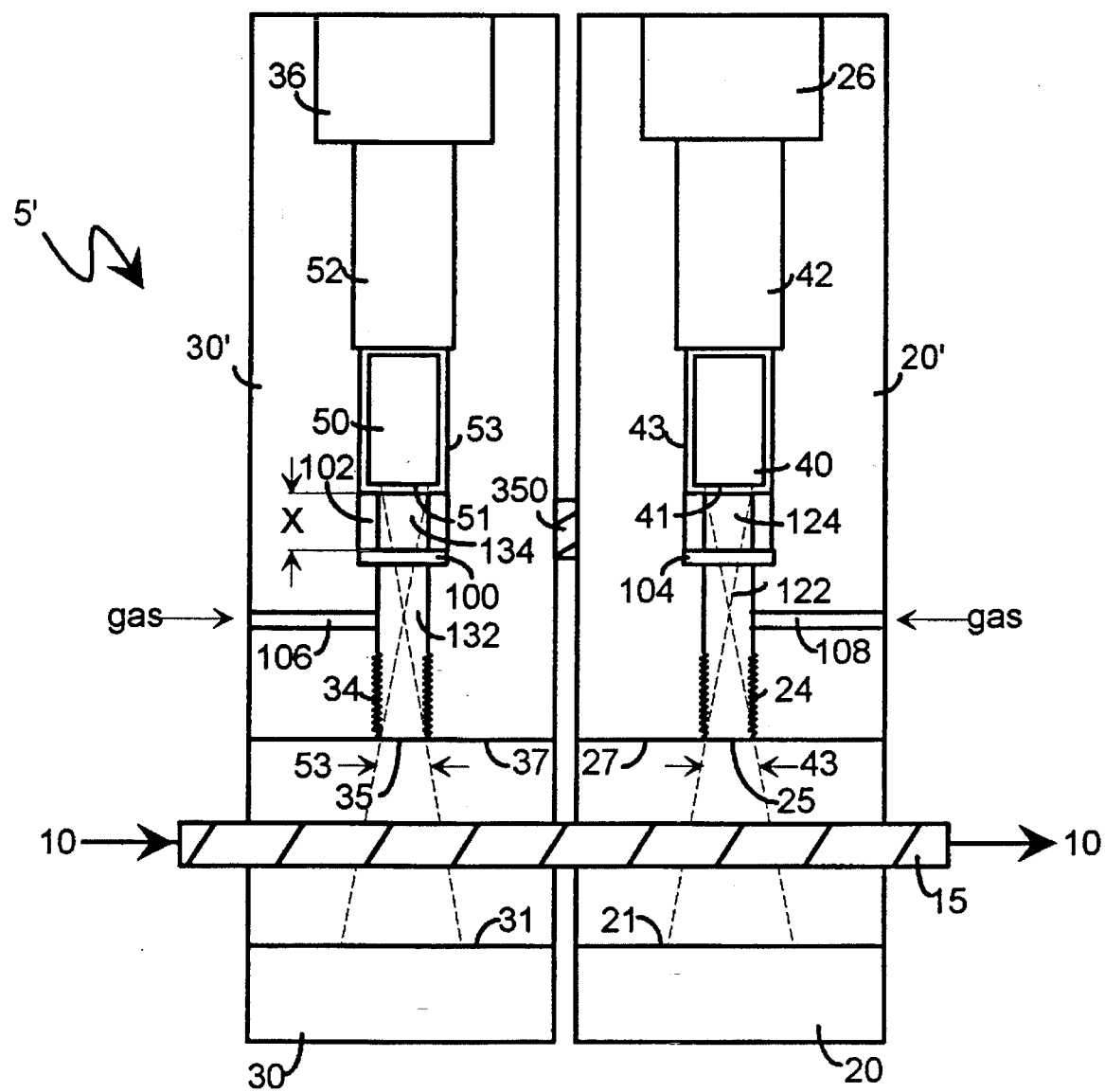
FIG. 2 illustrates, as an example, a cross-sectional front view of an alternative dual reference body structure, utilizing aspects of the present invention, useful for measuring the temperature of a moving object.

FIG. 2 illustrates, as an example, a cross-sectional front view of an alternative dual reference body structure 5', utilizing aspects of the present invention. As a first comment, it is to be appreciated that the present invention is not limited to any particular orientation of the dual reference body structures, 5 or 5'. For example, the alternative dual reference body structure 5' is formed by turning the dual reference body structure 5 upside down, and adding some additional components. Other orientations, such as having the dual reference bodies turned sideways, are also contemplated and within the scope of the present invention. Where components are constructed and operate substantially the same, identical reference numbers are used in both FIGS. 1A–1C and FIG. 2 to simplify the following description.

Besides the components as described in reference to FIGS. 1A–1C, the first and second reference bodies, 20' and 30', of the alternative reference body structure 5', also respectively include first and second purge holes, 108 and 106, for allowing a gas such as air to be injected into their respective cavities to purge their respective cavities of convective heat or other unwanted elements, and first and second windows, 104 and 100, positioned in their respective cavities such that they prevent the purge gas from striking the sensing surfaces, 41 and 51, of their respective first and second heat flow sensors, 40 and 50, and thus cause the purge gas to flow out of their respective cavities, along with the unwanted elements, through their respective apertures, 25 and 35.

Each of the windows, 104 and 100, is preferably secured and thermally bonded in its respective cavity by epoxy, and is formed of a high transmissivity material, such as, for example, cesium iodide or cesium bromide, which allow transmission of radiant energy to pass through at better than 85% over the spectral range of 0.5 to 40 microns. The windows, 104 and 100, are also preferably offset at a distance "x" from the sensing surfaces, 41 and 51, of their respective heat sensors, 40 and 50, by retainers 102, wherein the distance "x" is preferably comparable to the diameters "A" of their respective cavity apertures, 25 and 35. With the retainers 102 thus offsetting the windows, 104 and 100, from the sensing surfaces, 41 and 51, of their respective heat flow sensors, 40 and 50, the windows, 104 and 100, divide their respective cavities into two portions, the first being respective external cavities, 122 and 132, and the second being respective internal cavities, 124 and 134.

The windows, 104 and 100, are especially useful for protecting their respective heat flow sensors, 40 and 50, from unwanted elements such as, for examples, rising convection heat or smoke from the moving object 15. Accordingly, they also serve other useful purposes besides those described in reference to the purge gas example.

Figure 3:
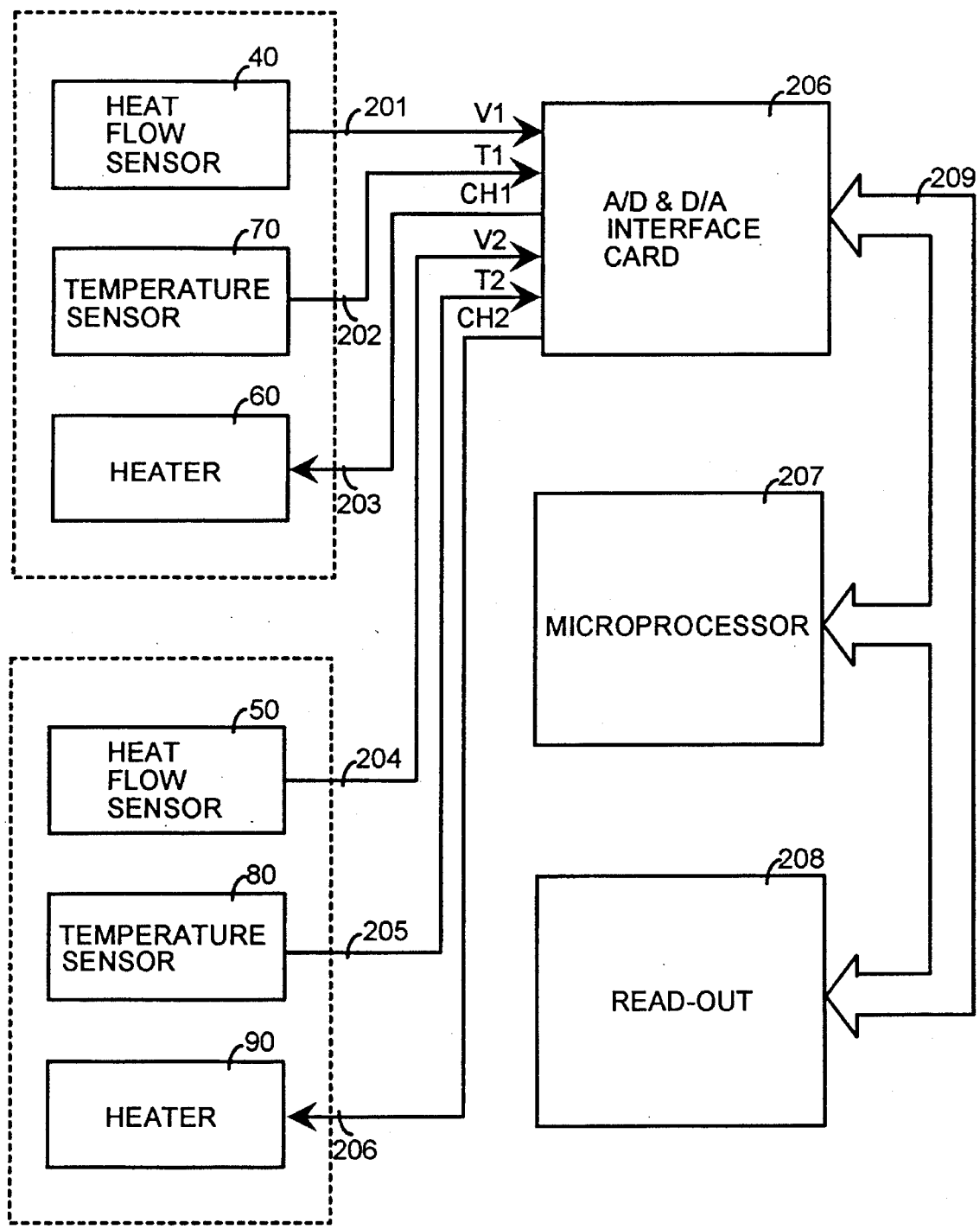
FIG. 3 illustrates, as an example, a block diagram of a system, utilizing aspects of the present invention, for measuring the temperature of a moving object.

FIG. 3 illustrates, as an example, a non-contact temperature measuring system employing the dual reference body structure of FIGS. 1A–1C or FIG. 2. An A/D & D/A interface card 206 receives at A/D inputs, 201, 202, 204, and 205, respectively, the output voltage $V_1$ from the first heat flow sensor 40, the output voltage $T_1$ of the first temperature sensor 70, the output voltage $V_2$ from the second heat flow sensor 50, and the output voltage $T_2$ from the second temperature sensor 80. The interface card 206 then converts the received analog signals into digital forms suitable for a microprocessor 207 to process, and provides such converted digitized data to the microprocessor 207 over data bus 209, so that the microprocessor 207 can calculate the temperature $T_{obj}$ of the moving object 15 by using equation (7) and cause the thus calculated value to be displayed on read-out unit 208.

In addition, the microprocessor 207, may also provide a heater control function by comparing the output voltages, $T_1$ and $T_2$, of the first and second temperature sensors, 70 and 80, respectively against predetermined levels prestored in the microprocessor 207 corresponding to desired temperatures for the first and second reference bodies, 20 and 30, and provide digital feedback signals to the interface card 206 which converts the digital feedback signals into analog signals, $C_{H1}$ and $C_{H2}$, and transmits at D/A outputs, 203 and 206, the analog control signals, $C_{H1}$ and $C_{H2}$, to the first and second heaters, 60 and 90, respectively. Alternatively, such heater control function may also be performed by one or more separate control circuits (not shown).

Although the various aspects of the present invention have been described with respect to a preferred embodiment, it will be understood that the invention is entitled to full protection within the full scope of the appended claims.

What is claimed is:

1. A non-contact temperature measuring system for measuring the temperature of an object, comprising:
    first and second reference bodies thermally isolated from each other, each of said first and second reference bodies having a first surface facing said object, and a cavity formed through said first surface;
    a first heat flow sensor positioned in said cavity of said first reference body such that said first heat flow sensor substantially only responds to radiation heat flow generated by a temperature difference between said object and said first reference body;
    a second heat flow sensor positioned in said cavity of said second reference body such that said second heat flow sensor substantially only responds to radiation heat flow generated by a temperature difference between said object and said second reference body;
    first and second temperature sensors for measuring the respective temperatures of said first and second reference bodies; and
    means for maintaining a temperature differential between the temperatures of said first and second reference bodies, wherein said cavity of said first reference body is formed such that convection heat flow generated by a temperature differential between said object and said first reference body is substantially prevented from reaching said first heat flow sensor, and said cavity of said second reference body is formed such that convection heat flow generated by a temperature differential between said object and said second reference body is substantially prevented from reaching said second heat flow sensor.

2. The non-contact temperature measuring system as recited in claim 1, wherein said first and second heat flow sensors are respectively thermally connected to said first and second reference bodies such that the temperature of said first heat flow sensor is substantially equal to the temperature of said first reference body, and the temperature of said second heat flow sensor is substantially equal to the temperature of said second reference body.

3. The non-contact temperature measuring system as recited in claim 2, wherein said first and second reference bodies are formed of copper.

4. The non-contact temperature determining system as recited in claim 2, wherein said first and second heat flow sensors in conjunction with their respective reference bodies have the same form factor and emissivity characteristics with respect to said object when said object is positioned in their respective lines of sight, and said system further comprises means for calculating said temperature of said object from the equation:

$$T_{obj} = \left( T_1^4 + V_1 \left[ \frac{(T_2)^4 - (T_1)^4}{V_1 - V_2} \right] \right)^{1/4}$$

where $T_{obj}$ is the absolute temperature of the object, $T_1$ is the absolute temperature of the first reference body, $T_2$ is the absolute temperature of the second reference body, $V_1$ is the output voltage of the first heat flow sensor, and $V_2$ is the output voltage of the second heat flow sensor.

5. The non-contact temperature measuring system as recited in claim 1, wherein said cavity of said first reference body has walls formed such that extraneous reflections originating from said radiation heat generated by the temperature differential between said object and said first reference body are minimized within said cavity.

6. The non-contact temperature measuring system as recited in claim 5, wherein said walls of said cavity of said first reference body are thermally black with a roughened texture.

7. The non-contact temperature measuring system as recited in claim 1, wherein said cavity of said second reference body has walls formed such that extraneous reflections originating from said radiation heat generated by the temperature differential between said object and said second reference body are minimized within said cavity.

8. The non-contact temperature measuring system as recited in claim 7, wherein said walls of said cavity of said second reference body are thermally black with a roughened texture.

9. The non-contact temperature measuring system as recited in claim 1, wherein said first reference body has a second surface formed parallel to its first surface such that its respective heat flow sensor substantially only detects radiation heat flow generated by a temperature differential between its first and second surfaces when said object is not positioned in a line of sight of its respective heat flow sensor.

10. The non-contact temperature measuring system as recited in claim 9, wherein said first and second surfaces of said first reference body are substantially at the same temperature.

11. The non-contact temperature measuring system as recited in claim 1, wherein said second reference body has a second surface formed parallel to its first surface such that its respective heat flow sensor substantially only detects radiation heat flow generated by a temperature differential between its first and second surfaces when said object is not positioned in a line of sight of its respective heat flow sensor.

12. The non-contact temperature measuring system as recited in claim 11, wherein said first and second surfaces of said second reference body are substantially at the same temperature.

13. The non-contact temperature measuring system as recited in claim 1, wherein said first heat flow sensor is a thermopile sensor.

14. A non-contact temperature measuring system for measuring the temperature of an object, comprising:
    first and second reference bodies thermally isolated from each other, each of said first and second reference bodies having a first surface facing said object, and a cavity formed through said first surface, wherein said cavity is partitioned into a first and second portion by a window preventing gas and vapors entering said first portion from entering said second portion, but substantially transmitting radiant energy between the first and second portions;

a first heat flow sensor positioned in said cavity of said first reference body such that said first heat flow sensor substantially only responds to radiation heat flow generated by a temperature difference between said object and said first reference body;

a second heat flow sensor positioned in said cavity of said second reference body such that said second heat flow sensor substantially only responds to radiation heat flow generated by a temperature difference between said object and said second reference body;

first and second temperature sensors for measuring the respective temperatures of said first and second reference bodies; and means for maintaining a temperature differential between the temperatures of said first and second reference bodies.

15. The non-contact temperature measuring as recited in claim 14, wherein said windows of said first and second reference bodies are formed of cesium iodide.

16. The non-contact temperature measuring as recited in claim 14, wherein said windows of said first and second reference bodies are formed of cesium bromide.

17. A non-contact temperature measuring system for measuring the temperature of a moving object comprising:

a first reference body having a first embedded heat flow sensor primarily responsive to radiation heat flow generated by a temperature differential between said moving object and said first reference body, wherein said first reference body, said first heat flow sensor, and said moving object define a first form factor and a first emissivity characteristic;

a second reference body having a second embedded heat flow sensor primarily responsive to radiation heat flow generated by a temperature differential between said moving object and said second reference body, wherein said second reference body, said second heat flow sensor, and said moving object define a second form factor and a second emissivity characteristic which are respectively equal to said first form factor and said first emissivity characteristic of said first reference body;

means for maintaining a temperature differential between said first and second reference bodies; and a logic circuit which calculates the temperature of said moving object from the equation:

$$T_{obj} = \left( T_1^4 + V_1 \left[ \frac{(T_2)^4 - (T_1)^4}{V_1 - V_2} \right] \right)^{1/4}$$

where $T_{obj}$ is the absolute temperature of said moving object, $T_1$ is the absolute temperature of said first reference body, $T_2$ is the absolute temperature of said second reference body, $V_1$ is a calibrated output voltage of said first heat flow sensor, and $V_2$ is a calibrated output voltage of said second heat flow sensor.

18. The non-contact temperature measuring system as recited in claim 17, wherein said first reference body has a first embedded temperature sensor for measuring the temperature of said first reference body, and said second reference body has a second embedded temperature sensor for measuring the temperature of said second reference body.

19. The non-contact temperature measuring system as recited in claim 18, wherein said logic circuit includes a microprocessor having a data bus, further comprising an analog-to-digital interface circuit having a plurality of inputs for receiving outputs of said first heat flow sensor, said second heat flow sensor, said first temperature sensor, and said second temperature sensor, and at least one output connected to said microprocessor data bus.

20. A non-contact method of determining the temperature of a moving object, comprising the steps of:

positioning first and second heat flow sensors in respective cavities of first and second reference bodies such that each of said heat flow sensors detects substantially only radiation heat flow from said moving object when said moving object is positioned in a conical line of sight extending out of its respective cavity, wherein said first and second reference bodies have the same form factors with respect to said moving object;

thermally connecting said first and second heat flow sensors to their respective reference bodies such that the temperature of said first heat flow sensor is substantially the same as the temperature of said first reference body, and the temperature of said second heat flow sensor is substantially the same as the temperature of said second reference body;

calibrating said first and second heat flow sensors to a same sensitivity;

applying and maintaining a temperature differential between said first and second reference bodies;

passing said moving object by respective conical lines of sight of said first and second heat flow sensors such that the output voltage of said first heat flow sensor is responsive to a first radiation heat flow generated by a temperature differential between said moving object and said first reference body, and the output voltage of said second heat flow sensor is responsive to a second radiation heat flow generated by a temperature differential between said moving object and said second reference body;

measuring the respective temperatures of said first and second reference bodies; and calculating the temperature of said moving object from said output voltages of said first and second heat flow sensors, and said temperatures of said first and second reference bodies.

21. The non-contact temperature determining method as recited in claim 20, wherein said calculating step comprises the step of calculating the temperature of said moving object from the following equation:

$$T_{obj} = \left( T_1^4 + V_1 \left[ \frac{(T_2)^4 - (T_1)^4}{V_1 - V_2} \right] \right)^{1/4}$$

where $T_{obj}$ is the absolute temperature of the moving object, $T_1$ and $T_2$ are the absolute temperatures of the first and second reference bodies, respectively, and $V_1$ and $V_2$ are the output voltages of the first and second heat flow sensors, respectively.

22. The non-contact temperature determining method as recited in claim 21, wherein said temperature differential applying step comprises the steps of heating said first reference body to a first temperature and said second reference body to a second temperature, and thermally isolating said first and second reference bodies from each other.

23. The non-contact temperature determining method as recited in claim 20, wherein said calibrating step comprises the steps of:

exposing said first and second heat flow sensors to an object of known temperature, $T_{obj}$;

determining the respective absolute temperatures, $T_1$ and $T_2$, of said first and second reference bodies;

measuring the output voltage, $V_2$, of said second heat flow sensor; and adjusting the output voltage, $V_1$, of said first heat flow sensor until it matches a value that satisfies the following equation:

$$T_{obj} = \left( T_1^4 + V_1 \left[ \frac{(T_2)^4 - (T_1)^4}{V_1 - V_2} \right] \right)^{1/4}$$

where $T_{obj}$ is the known absolute temperature of the moving object, $T_1$ and $T_2$ are the measured absolute temperatures of the first and second reference bodies, respectively, and $V_1$ and $V_2$ are the output voltages of the first and second heat flow sensors, respectively.

* * * * *